United States Patent [19]

Konagaya

[11] Patent Number: 4,467,364
[45] Date of Patent: Aug. 21, 1984

[54] DEVICE FOR MEASURING AMOUNT OF TONE CORRECTION

[75] Inventor: Masahiko Konagaya, Kobe, Japan

[73] Assignee: Konan Camera Research Institute, Inc., Kobe, Japan

[21] Appl. No.: 422,826

[22] Filed: Sep. 24, 1982

[30] Foreign Application Priority Data

Oct. 19, 1981 [JP] Japan .............................. 56-167346

[51] Int. Cl.³ .............................................. H04N 1/40
[52] U.S. Cl. ..................................... 358/280; 358/76; 358/80; 358/284
[58] Field of Search ................. 358/284, 282, 280, 80, 358/76

[56] References Cited

U.S. PATENT DOCUMENTS

| | | | |
|---|---|---|---|
| 4,037,249 | 7/1977 | Pugsley | 358/76 |
| 4,133,008 | 1/1979 | Tisue | 358/282 |
| 4,240,107 | 12/1980 | Yoshida | 358/93 |
| 4,285,009 | 8/1981 | Klopsch | 358/76 |
| 4,364,084 | 12/1982 | Akimoto et al. | 358/76 |
| 4,402,015 | 8/1983 | Yamada | 358/280 |

Primary Examiner—Howard W. Britton
Assistant Examiner—John K. Peng
Attorney, Agent, or Firm—Eugene E. Geoffrey, Jr.

[57] ABSTRACT

A device used, when a color printing block is produced from a color photographic film in accordance with color scanner technique, for compensating a difference in color density between photograph and print and arranged to measure accumulative density distribution of a color signal picked up from the photographic film, just before and after effecting tone control operation as monitoring an optimum tone-controlled color image, and, then, arithmetically process the measured data to obtain the amount of correction to be effected at each density, which is displayed on a cathode ray tube in a form of correction curve and/or printed on a paper in a form of table.

2 Claims, 5 Drawing Figures

DEVICE FOR MEASURING AMOUNT OF TONE CORRECTION

This invention relates to a device used in preparing color printing blocks from a color photographic film or transparency and, then, producing color prints therefrom, for measuring the amount of tone correction to be effected between the photographed and printed image in order to compensate for the difference in color density range therebetween. This device is especially useful when used with the so-called color scanner technique.

The color scanner is a device used for preparing color printing blocks from a color photographic film or transparency and is described, for example, in the article of Yoshio Ono, "OVERVIEW OF COLOR SCANNERS," Jour, Jap. Soc. Image Electronics, Volume 9, No. 2 (1980) pp. 93–101. In the color scanner, a color photographic transparency is scanned with a visible light beam, so-called "flying spot," and the transmitting light beam is separated into colors and converted into electric color signals. While each of the color signals is reconverted into light and used for exposing a lithographic plate, it is unsuitable to use this color as it is due to the difference in density range between the photographed and printed images. More particularly, the density range of the printed image is narrower than that of the photographic transparency by one figure or more in both black-and-white and colored images. Therefore, it is necessary to apply suitable tone correction including density range compression and gamma correction to the color signal before used in the lithographic process.

In the prior art, it has been a difficult matter to determine an optimum printing condition including the tone correction. One of the prior art methods is to rely upon the experiences of those skilled in the art. However, this method has no universality and may be subject to personal errors. Another method is the so-called "trial and error" in which the printing block is reproduced with reference to test prints. However, this method is heavily time-consuming and uneconomical. A further method is to use a highly sophisticated machine, such as the color scanner as disclosed in the above mentioned Ono article, which can effect tone correction through highly complicated analysis of the photographic image. However, such a machine is very expensive and difficult to be set up and handled.

Accordingly, an object of this invention is to provide a novel device which is simple in structure and can provide data of necessary amount of tone correction through a simple operation.

According to this invention, a device is provided for measuring the amount of tone correction, which includes a television camera for picking up an image on a photographic film or transparency as an electric video signal, a tone control circuit for adjusting tone of the video signal to equalize it to the desired tone of a printed image, and a monitoring television receiver for displaying the tone-controlled video signal. The device also includes means of deriving density information of the video signal from the input and output of the tone control circuit and producing a pair of accumulated density distributions therefrom, and means for calculating the amount of tone correction between the photographic and printed images from the difference of density at each accumulated density between both accumulated density distributions.

Now, the invention will be described in more detail hereinunder with reference to the accompanying drawings in conjunction with an embodiment for a black-and-white image.

IN THE DRAWINGS

Figure 1:
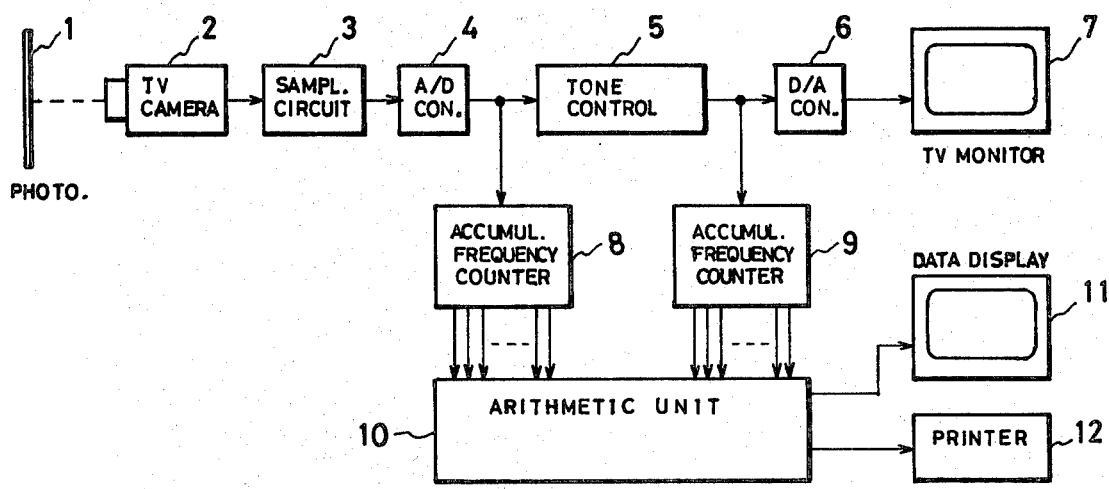
FIG. 1 is a block diagram representing an embodiment of the device according to this invention.

Referring first to FIG. 1, a photographed image (not shown) on a photographic film or transparency 1 is picked up by a conventional television camera 2 as an electric video signal which is decomposed into picture elements or "pixels" by a sampling circuit 3 and then digitized by an analog-to-digital (A/D) convertor 4. The digitized video signal is processed in a manually adjustable tone control circuit 5, converted back into an analog signal by a digital-to-analog (D/A) convertor 6 and then displayed by a monitoring television receiver 7 as a tone-controlled image. While the above mentioned structural components are well known in the art and will not be described further, the television camera 2 should convert the density of the photographic film 1 into the electrical signal at high fidelity and the monitoring receiver 7 should reproduce the displayed image faithfully to the input signal.

Since the displayed image on the receiver 7 has a width of density range comparable to that of the photographic image, the tone of the displayed image can be aligned with a desired tone of the printed image by adjusting the tone control circuit 5 while viewing the displayed image on the receiver 7. When the alignment is obtained, the amount of signal correction effected in the tone control circuit 5 is the very amount of tone correction required in the conversion from photographed image to printed image. Data of this amount of correction is derived as described as follows.

Figure 2:
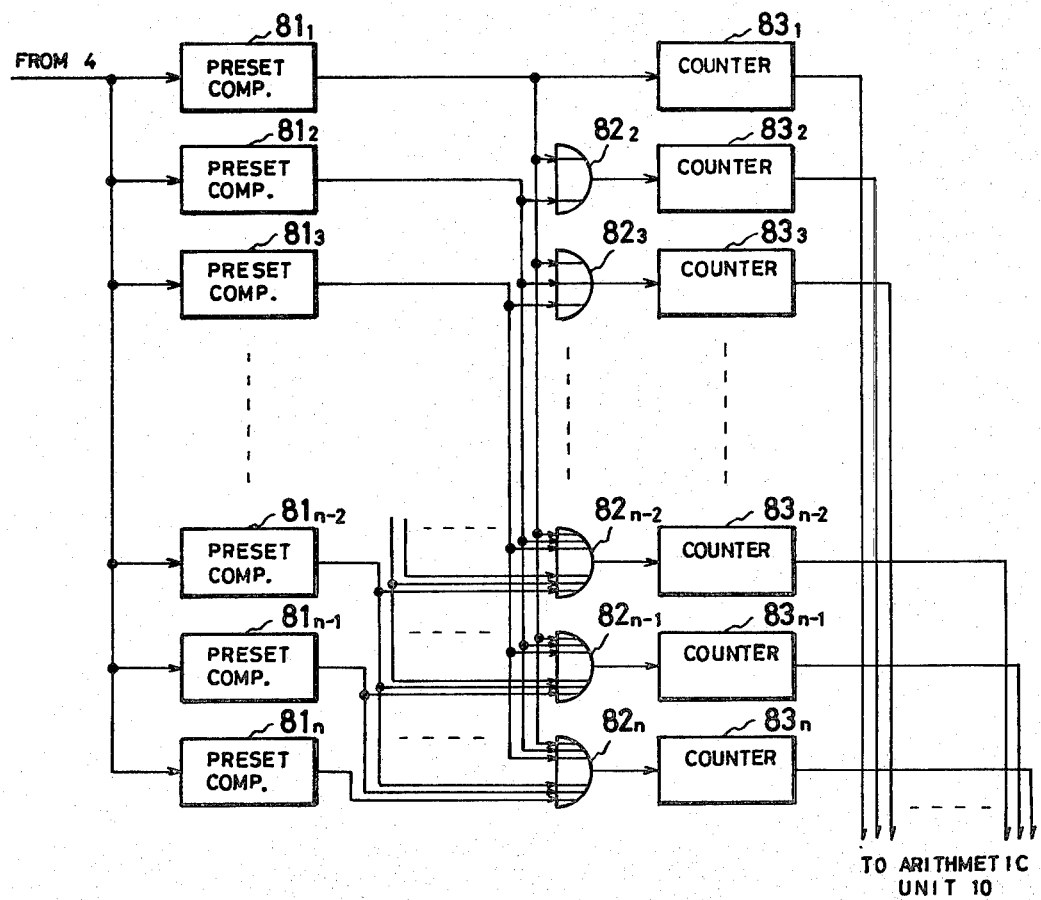
FIG. 2 is a block circuit diagram representing the accumulative frequency counter as shown in FIG. 1.

The input and output signals of the tone control circuit 5 are also applied to a pair of accumulative frequency counters 8 and 9, respectively. Both counters 8 and 9 are the same in circuit configuration and an embodiment is shown in FIG. 2. The accumulative frequency counter includes a plurality of preset comparators $81_1$, $81_2$, ... $81_n$. The necessary density range is divided into n-number of sub-ranges and the upper and lower limits of these sub-ranges are preset in order in the respective comparators $81_1$, $81_2$, ... $81_n$. Each comparator is arranged to produce an output pulse when the magnitude of an input signal falls within the corresponding sub-range preset therein. Therefore, the number of pulses from each comparator is indicative of the frequency of density value falling within its sub-range. The accumulative frequency counter also includes a plurality of pulse counters $83_1$, $83_2$, ... $83_n$ corresponding respectively to the comparators $81_1$, $81_2$, ... $81_n$ and the outputs of the comparators are coupled accumulatively to the respective counters through OR gates $82_2$, $82_3, \ldots 82_n$ in order. More specifically, the counter $83_1$ receives the output pulses of the comparator $81_1$ only, the counter $83_2$ receives the output pulses of the comparators $81_1$ and $81_2$, the counter $83_3$ receives the output pulses of the comparators $81_1$, $81_2$ and $81_3$, ... and so on, ... the counter $83_{n-1}$ receives the output pulses of the comparators $81_1$, $81_2$, ... $81_{n-1}$ and the counter $83_n$ receives the output pulses of the comparators $81_1$, $81_2$, .. $81_n$, as shown in FIG. 2. Thus, the counters $83_1$, $83_2$, ... $83_n$ provide output counts indicative of accumulated frequency distribution of density of the input video signal.

Figure 3:
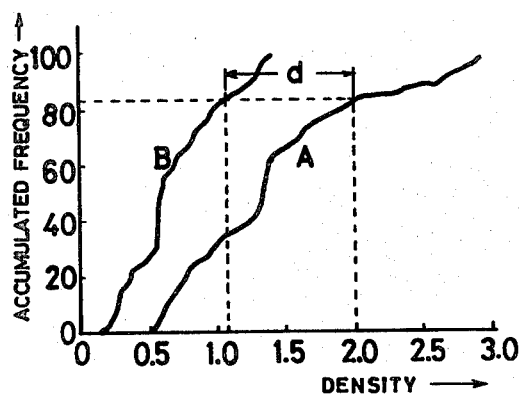
FIG. 3 is a diagram representing an example of accumulated density distributions produced from the outputs of the pair of accumulative frequency counters in FIG. 1.

Such accumulated frequency distributions obtained from the accumulative frequency counters 8 and 9 are shown by Curves A and B, respectively, in FIG. 3, as an example. As shown in dotted lines in FIG. 3, the accumulative frequency of the film density distribution A at density value of 2.0 is about 83 which corresponds to the density of about 1.1 of the monitored density distribution B. This means that the picture elements of the photographed image having a density of 2.0 are displayed on the monitor at density 1.1. Distance d between Curves A and B along the abscissa is indicative of the amount of tone correction at each density of the photographic image.

Figure 4:
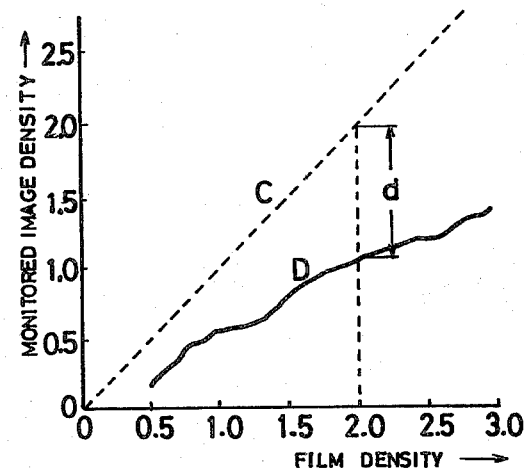
FIG. 4 is a diagram representing tone correction characteristics calculated from the distributions of FIG. 3 by the arithmetic unit of FIG. 1.

As the diagram of FIG. 3 is inconvenient for practical use, it is redrafted as shown in FIG. 4. In FIG. 4, a dotted straight line C with 45° inclination is a density conversion characteristic when there is no correction effected between the photographed and monitored images. In practice, however, the density must be reduced by d in the monitored image as described above. Therefore, the conversion characteristic is drafted as Curve D having vertical distance d from the line C varying with the film (photographed image) density in correspondence to FIG. 3.

The output signals of the accumulative frequency counters 8 and 9, which are indicative of accumulated density distributions A and B of FIG. 3, are applied to an arithmetic unit 10. The arithmetic unit 10 may be a commercially available microprocessor or microcomputer and executes calculation of the above mentioned amount of correction d. The calculated data are applied to a cathode ray tube display 11 to be displayed in the form of Curve D of FIG. 4, or to a printer 12 to be printed in the form of a table.

While the object of this invention is thus attained, description will be made hereinunder with reference to FIG. 5 about an example of the method of determining density of the printing block based upon the above mentioned result. The density of the printing block, which is the area rate of elemental points on a printing master, does not coincide with the density of the finished print but the relationship therebetween is known.

Figure 5:
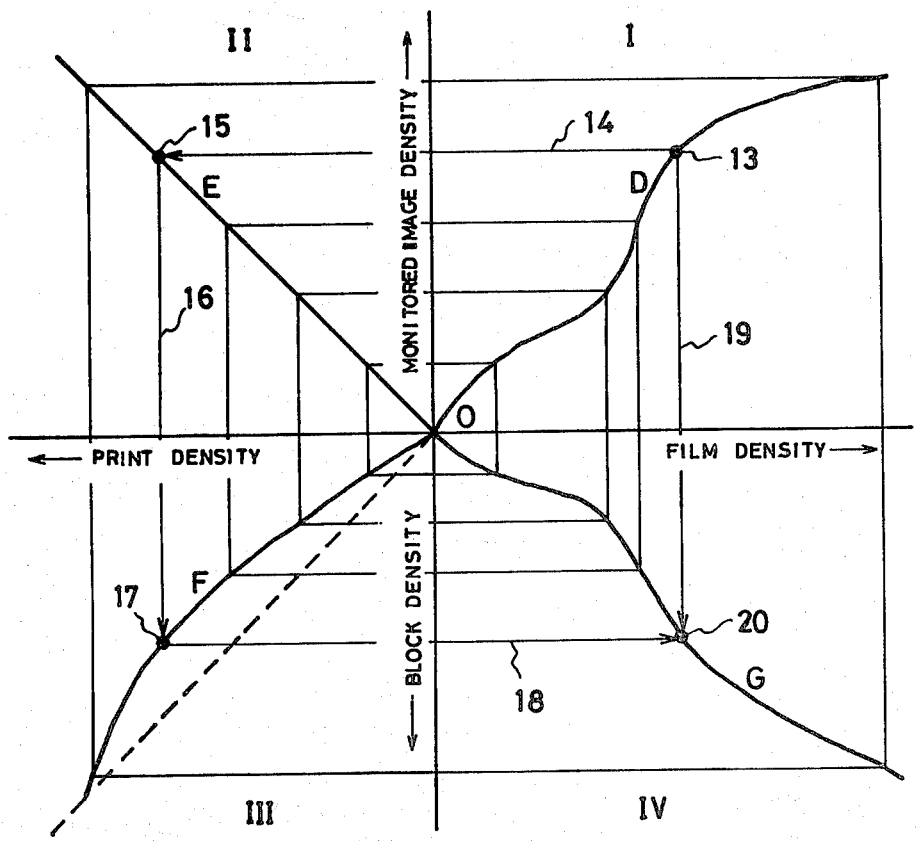
FIG. 5 is a diagram presented as an aid for explaining a method of producing density conversion characteristics from a photographic film to a corresponding printing block.

In FIG. 5, the abscissa indicates film (photographed image) density to the right side of origin O and print density to the left side of origin O, and the ordinate indicates monitored image density to the upper-side of origin O and printing block density to the lower-side of origin O. The Curve D shown in FIG. 4 is drafted in the first quadrant I. While the relationship between the monitored image density and the printed image density is shown in the second quadrant II, both densities must be identical and, therefore, the conversion characteristic therebetween is a straight line E with 45° inclination.

The relationship between the printing block density and the printed image density is known as mentioned above and Curve F is drafted in the third quadrant III in accordance with this relationship.

Density conversion characteristic G from photographic film to printing block in the fourth quadrant IV is drafted as follows. Choosing the point 13 on Curve D, a straight line 14 is drafted parallel to the abscissa therefrom to intersect Curve E at point 15. Then, a vertical straight line 16 is drafted from the point 15 parallel to the ordinate to intersect Curve F at point 17 from which another straight line 18 is drafted parallel to the abscissa. A vertical straight line 19 is also drafted from the point 13 parallel to the ordinate to intersect the straight line 18 at point 20. Similar operations are repeated for a number of points on Curve D and the resultant intersections in the fourth quadrant IV are connected with a curve to obtain the conversion characteristic G.

In producing a printing master block from a photographic film, densities of respective portions of the printing master are determined by converting densities of the corresponding portions of the film in accordance with Curve G and the master is produced in accordance with these densities. A printed image produced from this master can exhibit the same tone as observed by the monitoring receiver 7.

In producing printing blocks for colored images, a color television camera may be used to obtain prescribed primary color video signals and similar processing may be effected for each color video signal.

What is claimed is:

1. A device for measuring an amount of tone correction, comprising a television camera for picking up a photographed image on a transparency as an electric video signal, a tone control circuit coupled to the output of said camera for adjusting tone of said video signal to equalize the same to desired tone of a printed image, and a monitoring television receiver coupled to the output of said tone control circuit for displaying said tone-controlled video signal; characterized in that said device further comprises means coupled to receive the input and output signals of said tone control circuit for providing a pair of accumulative frequency distributions of density of said video signal just before and after said tone control circuit, respectively, and arithmetic means coupled to the outputs of said distribution providing means for calculating differences of density between both said distributions at each accumulative frequency, said difference being said amount of tone correction between said photographed and printed images.

2. A device according to claim 1 wherein said distribution providing means include a plurality of comparators arranged to store predetermined density ranges, respectively, and receive said video signal in common, each of said comparators being arranged to compare the density of said input video signal with said density range stored therein and produce an output pulse when said density falls within said range a plurality of pulse counters corresponding to said comparators respectively, for counting the input pulses, and means of coupling the outputs of said comparators accumulatively in order to the inputs of said counters, whereby said counters provide sequentially accumulative frequencies of density falling within said ranges, respectively.

* * * * *